July 31, 1962 A. R. KESKINEN 3,047,674

RECORDING AND REPRODUCING HEAD FOR MAGNETIC TAPE

Filed March 31, 1959

INVENTOR

ALLAN R. KESKINEN

BY Francis J. Klempay

ATTORNEY

3,047,674
RECORDING AND REPRODUCING HEAD FOR MAGNETIC TAPE

Allan R. Keskinen, Conneaut, Ohio, assignor to The Astatic Corporation, Conneaut, Ohio, a corporation of Ohio Filed Mar. 31, 1959, Ser. No. 803,265
5 Claims. (Cl. 179—100.2)

The present invention relates generally to apparatus for recording and reproducing intelligence and more particularly to an improved recording and reproducing head for use with magnetic tape and the like.

It is an object of the present invention to provide a recording and reproducing head for magnetic tape which comprises a pair of identical sub-assemblies which are joined together to provide the resultant recording and reproducing head. Such an arrangement greatly simplifies the manufacture of a recording and reproducing head since the same manufacturing, assembly and testing facilities and procedures may be employed with each of the identical sub-assemblies. Prior art recording and reproducing heads of this general type usually comprise two or more different sub-assemblies or component parts.

Another object of the invention is to provide a recording and reproducing head for magnetic tape which comprises a pair of sub-assemblies wherein each of the sub-assemblies is so designed that the same may be fully tested and inspected prior to final assembly of the resultant recording and reproducing head. This eliminates the expenditure of labor and time in assembling inoperative or defective recording and reproducing head since each of the sub-assemblies is fully tested and inspected prior to final assembly.

Yet a further object of the invention is to provide a recording and reproducing head for magnetic tape which comprises a pair of sub-assemblies wherein improved means are employed for the joining of the individual sub-assemblies to provide the resultant recording and reproducing head.

A further object of the invention is to provide an improved recording and reproducing head for magnetic tape of the dual track stereophonic or binaural type.

A still further object of the invention is to provide a recording and reproducing head for magnetic tape which embodies a highly simplified and advantageous terminal pin construction.

Yet another object of the invention is to provide an improved recording and reproducing head for magnetic tape which is characterized by its extreme simplicity and low cost of manufacture, testing and assembly whereby the same is well adapted to serve the mass market.

The above, as well as other objects and advantages of the invention, will become more fully apparent upon consideration of the following specification and accompanying drawing wherein there is disclosed a preferred embodiment of the invention.

Figures 1, 2, 3, 4:
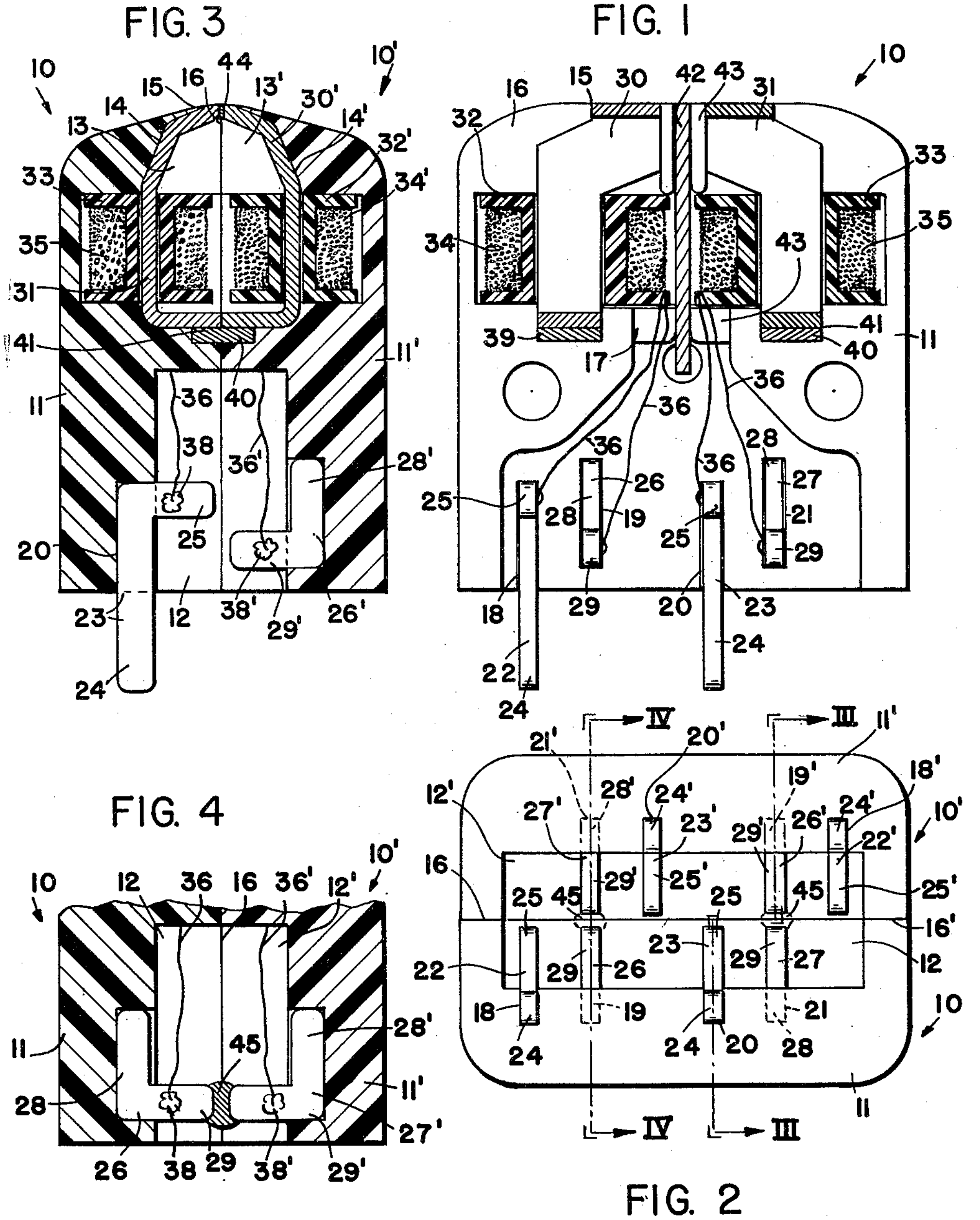
FIGURE 1 is a side elevation, partially in section, showing specifically one of the sub-assemblies employed in the recording and reproducing head for magnetic tape constructed in accordance with the teachings of the present invention.
FIGURE 2 is an underside plan view showing the assembled positions of two of the sub-assemblies shown in FIGURE 1 forming, when assembled, the improved recording and reproducing head for magnetic tape of the present invention.
FIGURE 3 is an end sectional view taken along the section line III—III of FIGURE 2.
FIGURE 4 is a fragmentary end sectional view as seen from the section line IV—IV of FIGURE 2.

Referring now to the drawing, there is shown a recording and reproducing head for magnetic tape which comprises a pair of identical sub-assemblies, generally designated by the reference indicia 10 and 10'. Each of the sub-assemblies 10 and 10' is identical in all respects and to avoid unnecessary repetition in the specification only one of these sub-assemblies will be described in detail. Like reference numerals have been applied to like parts of the sub-assemblies throughout all views of the drawing. However, in order to facilitate discussion and description of the final assembly of the two sub-assemblies, the parts of one of the sub-assemblies are indicated by primed reference numerals. As intimated above, the sub-assemblies are identical in all respects and are adapted to be joined at final assembly, in a manner to be hereinafter more fully described, to provide the resultant recording and reproducing head for magnetic tape.

Considering now the construction and organization of the sub-assembly 10, there is provided a generally rectangular housing section 11 which is preferably molded or otherwise formed to the shape shown in the various views of the drawing from a suitable non-magnetic material, such as plastic. The housing section 11 defines a generally rectangular and enlarged lower recess 12 and an enlarged generally rectangular upper recess 13 whose inwardly tapering side wall 14 terminaes at a point 15 spaced slightly inwardly of the vertically extending inner face 16 of the sub-assembly. The enlarged lower and upper recesses 12 and 13, respectively, are joined by a smaller intermediate recess 17.

Integrally formed in the side wall of the lower recess 12 are four rectangular and vertically extending slots 18–21. It will be noted that the alternate slots 18 and 20 extend completely to the bottom edge of the housing section 11 while the alternate slots 19 and 21 terminate a short distance above the bottom edge of the housing section and are contained solely within the side wall of the housing section. There are thus provided a pair of elongated slots 18 and 20 and a pair of shorter slots 19 and 21 and these slots are positioned in alternating relation. The slots 18 and 19 are positioned in spaced relation on one side of the center line of the housing section 11 closely adjacent the side wall of the recess 12 while the slots 20 and 21 are positioned on the other side of the center line closely adjacent said center line. Received and mounted in the slots 18 and 20 are a pair of identical L-shaped terminal pins 22 and 23. Each of the terminal pins 22 and 23 has one leg portion 24 which extends in the same plane as the slot associated therewith and protrudes a substantial distance below the lower edge of the housing section and a leg portion 25 which projects outwardly into the lower recess 12 but terminates a short distance from the inner face 16 of the housing section. The slots 19 and 20 are adapted to receive and mount a pair of identical L-shaped terminal connectors 26 and 27 whose leg portions 28 are received within the confines of these slots and whose leg portions 29 project into the lower recess 12 but terminate a short distance from the inner face 16 of the housing section. It will be noted that the leg portions 25 of the terminal pins 22 and 23 and the leg portions 29 of the terminal connectors 26 and 27 are disposed in vertically offset relation. The use and function of the terminal pins and terminal connectors will be hereinafter more fully described.

Received within the upper recess 13 of the housing section 11 are a pair of generally C-shaped core members 30 and 31 which are preferably stamped or otherwise formed from magnetic material, such as soft iron, for example. Each of the core members 30 and 31 conforms generally to the tapering side wall 14 of the upper recess 13 and opens outwardly toward the inner face 16 of the housing section.

Received about the generally vertically extending portions of the C-shaped core members 30 and 31 are the bobbins 32 and 33 which are made from insulating material. Each of the bobbins 32 and 33 is preferably made in two pieces whereby they may be slipped around the core members 30 and 31. After the bobbins 32 and 33 are received on the core members 30 and 31 the coils 34 and 35 are wound on their respective bobbins. Each of the coils 34 and 35 comprises a plurality of turns of current conductive wire, preferably copper, and is provided with a pair of lead wires 36. In the assembly of the sub-assembly 10 it is most convenient to first place the bobbins 32 and 33 about the core members 30 and 31 and then wind the coils 34 and 35. The two magnetic assemblies—each consisting of a core member, a bobbin and a properly wound coil—are then positioned en masse within the housing section 11 in adjacent side-by-side relation as shown in FIGURE 1 of the drawing. Of course, the enlarged upper recess 13 is shaped to nestingly receive the component parts of the two magnetic assemblies.

After the two magnetic assemblies have been properly mounted within the housing section 11 the lead wires 36 of the coil 34 are connected, by means of a drop of solder 38 for example, to the leg portions 25 and 29 of the terminal pin 22 and the terminal connector 26, respectively, intermediate the ends thereof. It will thus be seen that the plurality of turns comprising the coil 34 are electrically connected in series relation between the terminal pin 22 and the terminal connector 26. The leads 36 of the coil 35 are similarly connected to the leg portions 25 and 29 of the terminal pin 23 and terminal connector 27, respectively, intermediate the ends thereof whereby the plurality of turns comprising the winding 35 are electrically connected in series between the terminal pin 23 and the terminal connector 29.

After the assembly of the sub-assembly 10 has proceeded as above described the same is adapted to be inspected and tested. It will be observed from FIGURE 1 of the drawing that all component parts of the sub-assembly are completely exposed for visual inspection whereby it can be easily determined that all component parts are properly positioned and mounted within the housing section. Also, suitable electrical test equipment, not shown, may be connected between the pairs of terminal pins and terminal connectors—22, 26 and 23, 27—to electrically test the coils 34 and 35 and to insure that the sub-assembly is electrically acceptable. The inspection and testing of the sub-assembly is greatly facilitated since all component parts thereof, including the fragile lead wires 36 and the terminal pins 22 and 23 and the terminal connectors 26 and 27, are completely accessible and exposed.

The sub-assembly 10 is now laid aside and a sub-assembly 10′ is constructed and assembled in exactly the same manner as the sub-assembly 10. Similar connections are made between the lead wires 36′ and the terminal pins 22′ and 23′ and the terminal connectors 26′ and 27′. The completed sub-assembly 10′ is also inspected and tested to insure that the same is acceptable.

With the individual sub-assemblies 10 and 10′ thus assembled, inspected and tested the same are ready for final assembly to provide the resultant recording and reproducing head for magnetic tape. In the final assembly of the sub-assemblies 10 and 10′ the same are joined in face-to-face relation with the inner faces 16 and 16′ abutted against each other. This is clearly shown in FIGURES 2 and 3 of the drawing.

In effecting final assembly of the recording and reproducing head a pair of small magnetic shunt bars 39 and 40 are inserted into suitable recesses 41 provided in the housing sections 11 and 11′ adjacent the lower arms of the C-shaped core members 30 and 31. As shown in FIGURE 3 of the drawing, each of the shunt bars spans the abutted ends of the lower arms of two of the core members when the sub-assemblies 10 and 10′ are assembled. A magnetic shield 42 is put in place between the two magnetic assemblies of either of the sub-assemblies 10 or 10′ and is properly held in position by a plurality of locating bosses 43. As is the case with the magnetic shunt bars 39 and 40, the magnetic shield 42 spans the sub-assemblies 10 and 10′ when the same are finally assembled. The magnetic shunts 39 and 40 improve the magnetic circuits provided by mating ones of the core members while the magnetic shield 42 effectively isolates the mating pairs of magnetic assemblies from each other when the sub-assemblies 10 and 10′ are assembled.

The sub-assemblies 10 and 10′ are then brought together with the inner faces 16 and 16′ abutting each other whereby there is provided a stereophonic or binaural recording and reproducing head for magnetic tape. A shim 44 is inserted between the adjacent upper ends of the core members 30, 31′, 30′ and 31 and the sub-assemblies 10 and 10′ are securely cemented to each other.

It is next necessary to effect the required electrical connections. When the sub-assemblies 10 and 10′ are joined in face-to-face relation it will be found that the terminal connector 26 is aligned with the terminal connector 27′ and that the terminal connector 27 is aligned with the terminal connector 26′. It will also be observed that the terminal pins 22, 23, 22′ and 23′ are not aligned with respect to each other but are longitudinally spaced between the aligned pairs of terminal connectors. This is shown in FIGURE 2 of the drawing. To effect the required electrical connections it is only necessary to interconnect the aligned pairs of terminal connectors—27′, 26 and 26′, 27—by drops of solder 45 so that the coils 34 and 35′ which are disposed to one side of the magnetic shield 42 will be electrically connected across the terminal pins 22 and 23′ while the coils 35 and 34′ on the other side of the magnetic shield 42 will be electrically connected across the terminal pins 23 and 22′.

There is thus provided a stereophonic or binaural recording and reproducing head which comprises a pair of identical sub-assemblies. Each of the sub-assemblies mounts one-half of the component parts for both of the magnetic recording and reproducing head. The assembled recording and reproducing head provides a pair of magnetic recording and reproducing assemblies disposed on opposite sides of the magnetic shield 42.

The final assembly of the recording and reproducing head is completed by filling the cavity defined by the lower recesses 12 and 12′ of the housing sections 11 and 11′ with a suitable insulating resin, not particularly shown, whereby all of the lead wires 36 and 36′, terminal pins and terminal connectors are embedded in this insulating resin. In this manner the fragile lead wires 36 and 36′ as well as the terminal pins and terminal connectors are securely mounted in place and protected. Of course, the lower leg portions 24 and 24′ of the terminal pins 22, 23, 22′ and 23′ project below the lower edge of the housing sections 11 and 11′ and are adapted to be received in a suitable plug-in socket, not shown, for mounting and electrically connecting the recording and reproducing head in magnetic recording and reproducing apparatus, also not shown.

It should thus be apparent that the objects initially set forth have been accomplished. There has been provided a recording and reproducing head for magnetic tape which comprises a pair of identical sub-assemblies—each of which is easily manufactured, inspected and tested. The final assembly of the two sub-assemblies is effected by the highly improved and simplified means employed for providing the required electrical connections between the various coils.

Although we have disclosed a preferred embodiment of the invention it should be apparent that many changes may be made therein without departing from the clear teachings of the invention. For example, it is possible to construct a single track or a multi-track recording and reproducing head or an erase head for magnetic tape in accordance with the teachings of the present invention if such is desired. Accordingly, reference should be had to the following appended claims in determining the full scope and intent of the invention.

I claim:

1. A recording and reproducing head for magnetic tape and the like which comprises a pair of identical sub-assemblies, each of said sub-assemblies comprising a housing section, said housing section having an upper recess and a lower recess in the inner face thereof, at least one magnetic assembly nestingly received in said upper recess, said magnetic assembly comprising a magnetic core member and a coil of wire about said core member, said coil of wire having a pair of wire leads, a terminal pin and a terminal connector mounted in said lower recess in longitudinally spaced relation, said pair of wire leads being connected to said terminal pin and said terminal connector, said terminal pin and said terminal connector having leg portions projecting inwardly toward said inner face, said sub-assemblies having the inner faces thereof abutted, the leg portions of the terminal connectors of said sub-assemblies being aligned with respect to each other, the terminal pins of said sub-assemblies being spaced with respect to each other and said aligned terminal connectors, and means electrically interconnecting said aligned terminal connectors whereby the coils of the magnetic assemblies of said sub-assemblies are connected in series relation between said terminal pins.

2. Apparatus according to claim 1 further characterized in that said terminal pins and said terminal connectors are generally L-shaped, a pair of spaced vertically extending slots in each of the lower recesses of said sub-assemblies, and portions of said L-shaped terminal pins and said terminal connectors being received in said slots.

3. Apparatus according to claim 1 further characterized in that each of said terminal pins comprises an L-shaped member, a vertically extending slot in said lower recess of each of said sub-assemblies, said slot extending to the lower edge of said housing section, one portion of said terminal pin being received in said slot, and said one portion projecting downwardly beyond said lower edge of said housing section to define an output terminal.

4. A recording and reproducing head for magnetic tape and the like which comprises a pair of identical sub-assemblies, each of said sub-assemblies comprising a mounting block formed of insulating material and having recesses extending inwardly from one side face thereof, a magnetic assembly having a core member and a coil encircling said core member received in certain of said recesses, a terminal pin and a terminal connector received in other of said recesses, said coil having one of its terminal leads connected to said terminal pin and the other of its terminal leads connected to said terminal connector, said sub-assemblies being joined with said faces contacting each other and with said cores in contact with each other to thereby provide a substantially closed magnetic circuit with the two coils of the assembly encircling said circuit in series relation therewith, said terminal pins projecting outwardly of the assembled blocks to provide a plug-in electrical connection, and means electrically interconnecting said terminal connectors to place said coils in series across said terminal pins.

5. A recording and reproducing head for magnetic tape and the like which comprises a pair of identical sub-assemblies, each of said sub-assemblies comprising a housing section, said housing section having a recess in the inner face thereof, a pair of magnetic assemblies received within said recess in spaced relation, each of said magnetic assemblies comprising a C-shaped core member and a coil of wire about said core member, each of said coils of wire having a pair of wire leads, said sub-assemblies having the inner faces thereof abutted whereby opposite ones of said magnetic assemblies are positioned adjacent each other to define aligned and spaced pairs of said magnetic assemblies, a common plate-like magnetic shield spanning said sub-assemblies and mounted between said spaced and aligned pairs of said magnetic assemblies, a pair of magnetic shunts each spanning said sub-assemblies and the lower adjacent ends of said C-shaped core members of one of said aligned and spaced pairs of magnetic assemblies, and output terminal means for said magnetic assemblies, said output terminal means comprising a terminal pin and a terminal connector for each of said magnetic assemblies, said pair of wire leads of each of said magnetic assemblies being connected to said terminal pin and said terminal connector associated therewith, the terminal pins and the terminal connectors being disposed in adjacent facing relation in said sub-assemblies, and said terminal connectors of said sub-assemblies being electrically connected whereby said pairs of magnetic assemblies are connected across said terminal pins.

References Cited in the file of this patent

UNITED STATES PATENTS

| | | |
|---|---|---|
| 1,383,764 | Sargent | July 5, 1921 |
| 2,751,440 | De Turk | June 19, 1956 |
| 2,785,232 | Camras | Mar. 12, 1957 |
| 2,835,742 | Moehring et al. | May 20, 1958 |
| 2,908,770 | Warren | Oct. 13, 1959 |

FOREIGN PATENTS

| | | |
|---|---|---|
| 801,904 | Great Britain | Sept. 24, 1958 |